Nov. 24, 1925.

H. E. F. BRECKNELL

COLLECTOR FOR ARTICLES ON DELIVERY FROM
PRINTING, PUNCHING, AND LIKE MACHINES

Filed Dec. 29, 1923

Patented Nov. 24, 1925.

1,563,071

UNITED STATES PATENT OFFICE.

HENRY EDWIN FRANK BRECKNELL, OF BRISTOL, GLOUCESTER, ENGLAND, ASSIGNOR TO BRECKNELL, MUNRO & ROGERS LIMITED, OF BRISTOL, GLOUCESTER, ENGLAND.

COLLECTOR FOR ARTICLES ON DELIVERY FROM PRINTING, PUNCHING, AND LIKE MACHINES.

Application filed December 29, 1923. Serial No. 683,453.

*To all whom it may concern:*

Be it known that I, HENRY EDWIN FRANK BRECKNELL, of Thrissell Street, Bristol, Gloucester, England, a subject of the King of Great Britain and Ireland, have invented certain new and useful Improvements in or Relating to Collectors for Articles on Delivery from Printing, Punching, and like Machines, of which the following is a specification.

This invention relates to collectors for collecting sheets of paper, cardboard, millboard and the like on delivery from printing, printing and cutting, printing and punching and like machines.

This invention has for its object to provide improved collector mechanism and apparatus so that sheets whether of rectangular or any irregular shape, are as they come from the printing or other machine, mechanically piled into packs by each sheet being dropped in succession flatwise onto that immediately previously dropped, and these packs delivered from the collector; all the operations being effected in such a manner that no sliding movement of one sheet over another occurs, and accordingly printed matter on the sheets is not subjected to smudging or blurring action.

A collector made in accordance with this invention comprises a receiving platform, means for placing each article on the platform, guides for locating the article on the platform, means for moving the receiving platform to allow each article to fall separately and a collecting platform and guides below the receiving platform, and means for removing the articles from the collecting platform when the required number have been collected.

Referring to the drawings filed herewith:

Fig. 3 is a half or partial plan of the collecting sectors;

Figure 1:
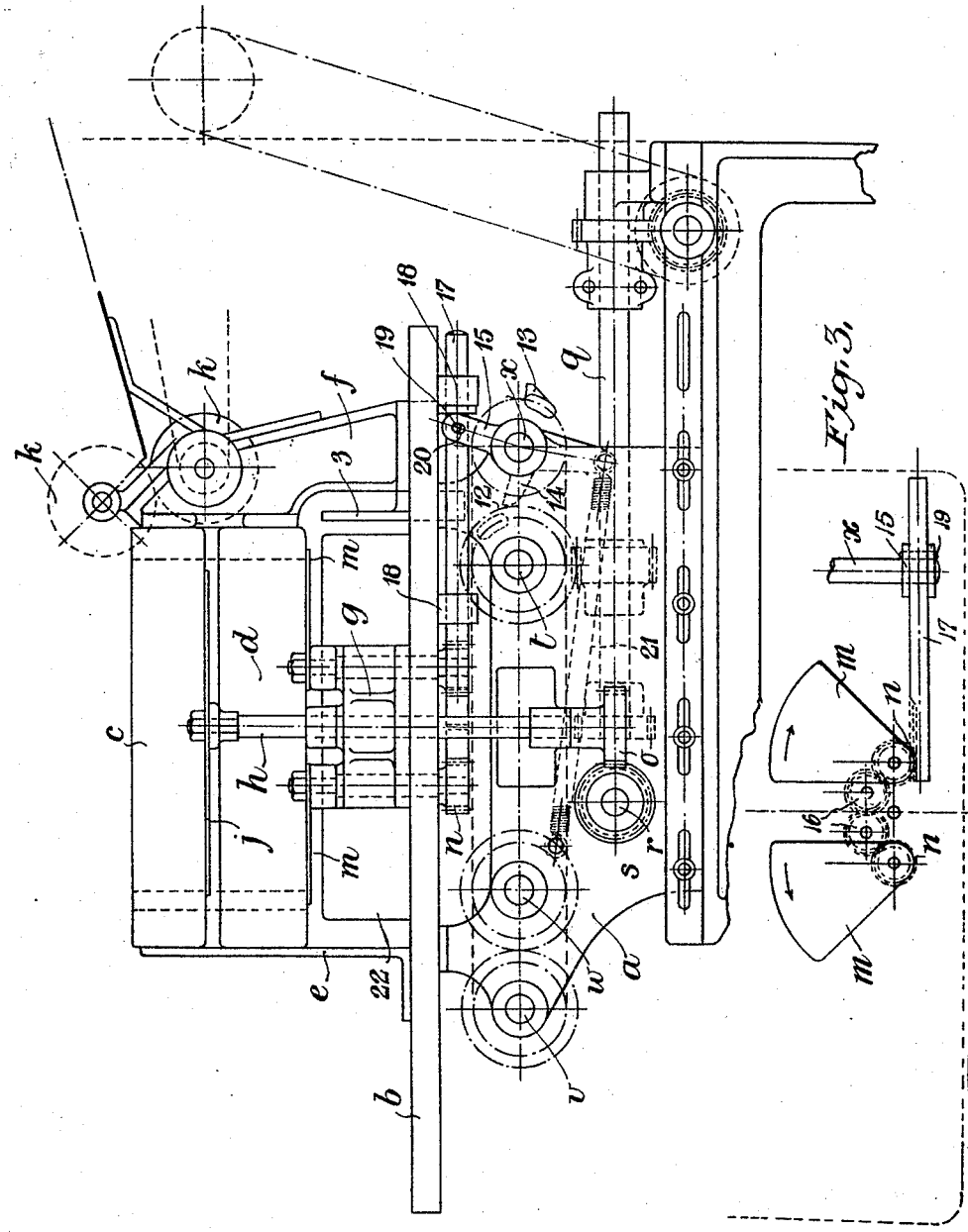
Fig. 1 is a side elevation of one form of collecting device made in accordance with this invention.
Figure 2:
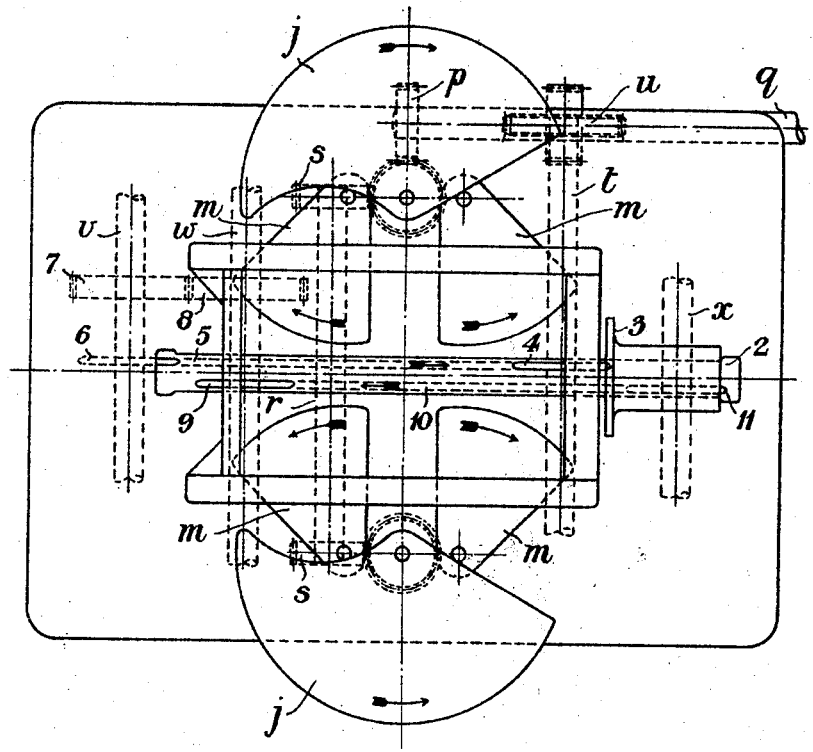
Fig. 2 is a plan of Fig. 1.
Figure 4:
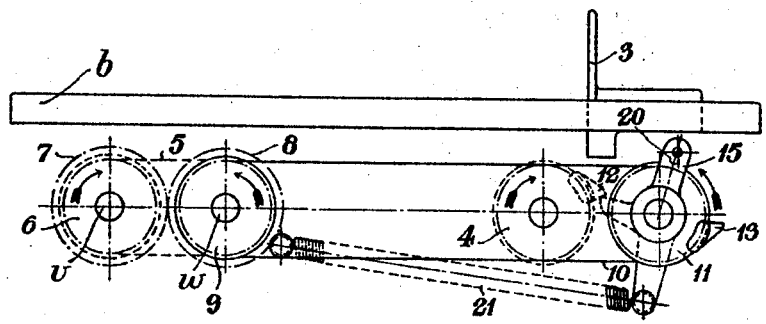
Fig. 4 is an elevation of the mechanism for moving the articles on the delivery platform.

In the form shown in the drawings, $a$ is the frame of the device, $b$ is a delivery platform mounted on the frame $a$, receiving guides $c$ and falling guides $d$ are supported on brackets $e$ and $f$ mounted on the delivery platform $b$. Mounted in the frame $a$ and supported in brackets $g$ on the platform $b$ are vertical shafts $h$, passing through the platform $b$ on the upper ends of which are receiving sectors $j$ disposed below and adapted to form a receiving platform within the guides $c$.

Mounted on the bracket $f$ are throwing rolls $k$ for delivering the articles to the receiving guides and onto the receiving sectors.

Mounted in the brackets $g$ are pairs of rotatable collecting sectors $m$ disposed below and adapted to form a collecting platform within the guides $d$. The shafts on which the sectors $m$ are mounted pass through the platform $b$ and are provided at their lower ends with spur wheels $n$.

The vertical shafts $h$ are provided at their lower ends with gear wheels $o$, one of which is driven by a gear $p$ mounted on a shaft $q$. A countershaft $r$ is mounted in the frame $a$ and carries at its ends gears $s$ engaging with the gear wheels $o$ thereby connecting the shafts $h$ so that the sectors $j$ rotate together in opposite directions, and are timed so that they make one revolution for each article which is delivered to them.

Mounted in the frame $a$ is a transverse shaft $t$ driven by the shaft $q$ through a worm gear $u$. Three shafts $v$, $w$ and $x$ parallel to the shaft $t$ are mounted in the frame $a$.

In the centre of the delivery platform $b$ is a longitudinal slot 2 in which is mounted a sliding bracket or busher 3. On the shaft $t$ is a chain wheel 4 directly below the slot 2 and a chain 5 is arranged on the chain wheel 4 and a chain wheel 6 carried by the shaft $v$. The shaft $v$ also carries a gear wheel 7 which engages a gear wheel 8 on the shaft $w$. The shaft $w$ also carries a chain wheel 9 disposed below the slot 2 and a chain 10 is mounted on the wheel 9 parallel to the chain 5 and passing over a chain wheel 11 rotatably mounted on the shaft $x$.

The two chains 5 and 10 are therefore driven in opposite directions. On the chain 5 is mounted a trip block 12 and on the chain 10 is mounted a trip block 13. These trip blocks 12 and 13 engage with and slide the bracket 3 backwards and forwards along the slot 2. On the shaft $x$ and secured thereto is a trip lever 14 which engages with the trip block 12 so as to cause partial rotation of the shaft $x$. On each end of the shaft $x$ and secured thereto are forked operating levers 15.

The sectors $m$ are geared together in pairs by gear wheels 16 engaging with the gear wheels $n$ so that they turn together in opposite directions. Two racks 17 are provided engaging with one wheel $n$ of each pair of sectors the racks being carried in guide brackets 18 secured to the underside of the platform $b$. The racks rest in the forked ends of the forked levers 15 and carry driving pins 19 which engage slots 20 in the ends of the forked levers 15. A return spring 21 is provided for the forked levers 15. Guides 22 are provided on the delivery platform $b$ for the piles of articles.

In operation the receiving sectors $j$ are timed to lie within the guides $c$ to receive each article as it is delivered by the throwing rolls $k$. These sectors then swing clear allowing the articles to fall onto the collecting sectors $m$ which are then within the guides $d$ forming a collecting platform. When a sufficient number of articles have been collected on the sectors $m$ and between the guides $d$ the sectors are operated to turn outward and release the pile of articles by the action of the trip block 12 engaging the trip lever 14 thereby producing a partial rotation of the shaft $x$ and causing the racks 17 engaging with the gear wheels $n$ to be actuated by the operating levers 15. The sectors $m$ are timed to return to their normal position to receive the next article, the action being effected by the springs 21 immediately the trip block 12 has passed on so as to disengage from and release the trip lever 14.

The trip block 13 will now engage with the sliding bracket or pusher 3 and the pusher 3 will be carried along the delivery platform $b$ onto which the pile of articles have fallen from the collecting sectors $m$ and the pile of articles will be moved along to the end of travel of the pusher 3 to leave the platform clear for the next pile of articles. The pusher 3 will then be returned by the trip block 12 so as to be in position ready for the release of the next pile of articles from the collectors $m$.

What I claim and desire to secure by Letters Patent is:

1. A collector comprising a receiving platform, consisting of at least one horizontally rotating sector, means for placing each article on the platform, guides for locating the article on the platform, means for moving the receiving platform to allow each article to fall separately, rotatable members forming a collecting platform, and guides below the receiving platform.

2. A collector as claimed in claim 1 comprising a pusher member for removing the articles from the collecting platform when the required number have been collected, and means for actuating said pusher member.

3. A collector comprising a frame, guides for the article mounted on the frame, a pair of horizontally rotatable sectors mounted on the frame and adapted to form a receiving platform between the guides, means for rotating the sectors so as to receive and let fall each article separately, and guides and a collecting platform below the receiving platform.

4. A collector comprising a frame, guides for the article mounted on the frame, a pair of rotatable sectors mounted on the frame and adapted to form a receiving platform between the guides, means for rotating the sectors so as to receive and let fall each article separately, falling guides for the articles, rotatable sectors forming a collecting platform below the receiving platform, means for rotating said sectors when the required number of articles have been collected so as to release the pile of articles and return to receive the next article and a delivery platform below said sectors.

5. A collector comprising a frame, guides for the article mounted on the frame, a pair of rotatable sectors mounted on the frame and adapted to form a receiving platform between the guides, means for rotating the sectors so as to receive and let fall each article separately, falling guides for the articles, rotatable sectors forming a collecting platform below the receiving platform, means for rotating said sectors when the required number of articles have been collected so as to release the pile of articles and return to receive the next article, a delivery platform below said sectors and means for moving the articles on the delivery platform from below the collecting platform.

In testimony whereof, I affix my signature.

HENRY E. F. BRECKNELL.